United States Patent [19]

Habu et al.

[11] 4,039,520
[45] Aug. 2, 1977

[54] GELATIN HARDENING PROCESS

[75] Inventors: Teiji Habu; Hisashi Yamaguchi; Tsuneo Wada; Takashi Sasaki; Hiroki Ishii; Takayoshi Omura; Hiroyuki Inokuma, all of Hino, Japan

[73] Assignee: Konishiroku Photo Industry Co., Ltd., Nihonbashi-Muro, Japan

[21] Appl. No.: 450,227

[22] Filed: Mar. 11, 1974

[30] Foreign Application Priority Data

Mar. 12, 1973   Japan ................................ 48-27949
Mar. 19, 1973   Japan ................................ 48-30952

[51] Int. Cl.$^2$ ............................................. C09H 7/00
[52] U.S. Cl. ............................ 260/117; 96/111; 260/268 C; 260/295 PA; 260/479 C; 260/481 C; 260/482 C; 260/552 R; 260/553 D; 260/553 E; 260/556 A; 260/556 S; 260/553 A; 260/553 C

[58] Field of Search .............. 260/117, 553 A, 553 D, 260/553 E; 106/125; 96/111, 50 PT, 67

[56] References Cited

U.S. PATENT DOCUMENTS

| | | | |
|---|---|---|---|
| 3,174,861 | 3/1965 | Himmelmann et al. | 260/117 X |
| 3,444,156 | 5/1969 | Montmollin et al. | 260/117 |
| 3,455,892 | 7/1969 | Froehlich | 260/117 |
| 3,455,893 | 7/1969 | Froehlich | 260/117 |
| 3,539,351 | 11/1970 | Burness et al. | 260/117 X |
| 3,551,159 | 12/1970 | Froehlich | 260/117 X |
| 3,640,720 | 2/1972 | Cohen | 260/117 X |
| 3,689,274 | 9/1972 | Sobel et al. | 96/111 |
| 3,749,573 | 7/1973 | Froehlich | 260/117 X |

FOREIGN PATENT DOCUMENTS 730,093   3/1966   Canada

Primary Examiner—Paul R. Michl

[57] ABSTRACT

A process for hardening gelatin which comprises reacting photographic gelatin with a compound of the general formula

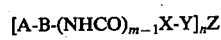

[A-B-(NHCO)$_{m-1}$X-Y]$_n$Z wherein A is $CH_2=CH-$, $CH_2=C(R_1)-$, $CH_2(R_1)-CH_2-$ or $CH_2(R_1)-CH(R_2)-$ (where $R_1$ and $R_2$ are halogens); B is $-CO-$ or $-SO_2-$; X is oxygen, sulfur or $-NH-$; Y is $-CO-$, $-SO_2-$ or a simple bond, and when Y is $-CO-$ or $SO_2-$, X is $-NH-$; m is 1 or 2; n is an integer of 2 or more; and Z is a simple bond, an n-valent aliphatic, alicyclic, aromatic or heterocyclic group, or an n-valent group comprising the combination of said groups, $-CO-$,

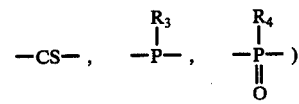

in which $R_3$ and $R_4$ individually represent an alkyl group which may have substituents, an aryl group which may have substituents, an alkoxy group which may have substituents, an aryloxy group which may have substituents, an alkylamino group which may have substituents, or an arylamino group which may have substituents); and As, Bs, Xs and Ys may individually be the same or different.

7 Claims, No Drawings

GELATIN HARDENING PROCESS

This invention relates to a process for hardening gelatin by use of a novel hardener, and more particularly to a gelatin hardening process suitable for hardening gelatin films of light-sensitive silver halide photographic materials.

Generally, light-sensitive silver halide photographic materials are prepared by forming on a proper support, such as glass, paper or synthetic resin film, various layers such as silver halide photographic emulsion layer, filter layer, inter layer, protective layer, sub layer, backing layer, antihalation layer, etc. These photographic layers consist of so-called gelatin films composed mainly of gelatin. Accordingly, the physical properties of the photographic layers consisting of gelatin films depend chiefly on those of gelatin. However, gelatin itself has such properties as being low in melting point, high in water swellability and low in mechanical strength. These properties are extremely undesirable as the physical properties of layers of light-sensitive silver halide photographic materials. It has therefore been an ordinary practice hitherto that various hardeners are reacted with gelatin to crosslink the hardeners with amino, carboxyl, amide and like functional groups in the gelatin molecules, thereby improving the physical properties of gelatin. As such hardeners, there have previously been known inorganic hardeners comprising polyvalent metal salts such as chromium alum, chromium trichloride and like chromium salts or aluminum salts, and organic hardeners such as formalin, glyoxal and acrolein and their derivatives. Photographically, however, these hardeners have various drawbacks, and most of them bring about many such disadvantages such as, for example, being strong in desensitizing action, promoting the formation of fog, being too slow in hardening action to be put into practical use, disturbing the color forming ability of couplers used in color emulsions, and being excessively rapid in hardening action to make the preparation of light-sensitive photographic materials difficult or, conversely, not being able to display desired hardening effects unless incubated sufficiently.

Moreover, in relation to recent speedy advances of, quick processing of light-sensitive photographic materials has been required. In order to meet such requirement, not only photographic materials themselves have been improved so as to be adapted to quick processing, but also processing solutions have been improved so as to be suitable for treatment of such photographic materials. For example, in order to make quick penetration of processing solutions possible, photographic materials have involved increases in amount of silver halide and decreases in amount of gelatin so as to be made thinner, with the result that not only the photographic materials are increased in fog but also the film properties thereof are further deteriorated. Furthermore, with propagation of automatic processing machines, photographic materials are required to have film properties sufficiently high in mechanical strength so as to be able to withstand severe mechanical abrasion. In addition, with the increasing incidence of high-temperature short-period treatment by use of strong processing solutions, photographic materials are required to have strong film properties which do not impair the photographic properties.

Accordingly, most of the conventional hardeners bring about various disadvantages with respect to the quick processing of light-sensitive photographic materials. For example, if only the amount of hardener is increased in order to obtain stronger physical properties of gelatin film, not only does the hardener cause increase of densensitization and fogging but also the covering power is lowered. Even if the hardness of film is increased, the film becomes so brittle that the photographic material is only with difficulty subjected to as automatic processing machine.

An object of the present invention is to provide a hardener which brings about no such disadvantages as mentioned above.

Another object of the invention is to provide a process for hardening gelatin, particularly gelatin films of light-sensitive silver halide photographic materials, by use of the above-mentioned hardener.

These objects can be accomplished by using as the hardener a compound having the general formula,

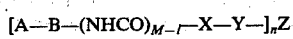

wherein A is $CH_2=CH-$, $CH_2=C(R_1)-$, $CH_2(R_1)-CH_2-$ or $CH_2(R_1)-CH(R_2)-$ (where $R_1$ and $R_2$ are halogens); B is $-CO-$ or $-SO_2-$; X is oxygen, sulfur or $-NH-$; Y is $-CO-$, $-SO_2-$ or a simple bond, and when Y is $-CO-$ or $-SO_2-$, X is $-NH$; $m$ is 1 or 2; $n$ is an integer of 2 or more; and Z is a simple bond, an n-valent aliphatic, alicyclic, aromatic or heterocyclic group, or an n-valent group comprising the combination of said groups,

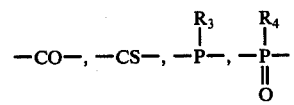

(in which $R_3$ and $R_4$ individually represent an alkyl group which may have substituents, an aryl group which may have substituents, an alkoxy group which may have substituents, an aryloxy group which may have substituents, an alkylamino group which may have substituents, or an arylamino group which may have substituents); and As, Bs, Xs and Ys may individually be same or different.

One prominent group of compounds usable in the present invention are those which have the general formula

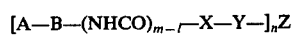

wherein A is $CH_2=CH-$, $CH_2=C(R_1)-$, $CH_2(R_1)-CH_2-$ or $CH_2(R_1) CH(R_2)-$ (where $R_1$ and $R_2$ are halogens); B is $-CO-$ or $-SO_2-$; X is oxygen, sulfur or $-NH-$; Y is $-CO-$, $-SO_2-$ or a mere bond, at least one of Ys being f$-CO-$ or $-SO_2-$, and when Y is $-CO-$ or $-SO_2-$, X is $-NH-$; $m$ is 1 or 2; $n$ is an integer of 2 or more; and Z is a mere bond, an n-valent aliphatic, alicyclic, aromatic or heterocyclic group, or an n-valent group comprising the combination of said groups, and when Z is a mere bond, Y is $-CO-$; As, Bs, Xs and Ys may individually be same or different.

Another prominent group of compounds usable in the present invention are those which have the general formula

wherein A represents $CH_2=CH-$, $CH_2=C(R_1)-$, $CH_2(R_1)-CH_2-$ or $CH_2(R_2)-$ in which $R_1$ and $R_2$ individually represents halogen atom, Y represents oxygen or sulfur atom or $-NH-$, m represents 1 or 2, n represents an integer of 2 or more, and Z represents n-valent aliphatic group, n-valent alicyclic group, n-valent aromatic group, n-valent heterocyclic group or n-valent group consisting of bonds of these groups,

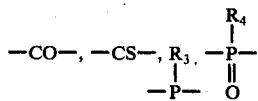

in which $R_3$ and $R_4$ individually represent an alkyl group which may have substituents, an aryl group which may have substituents, an alkoxy group which may have substituents, an aryloxy group which may have substituents, an alkylamino group which have substituents, an arylamino group which may have substituents, or a simple bond, and when Z is

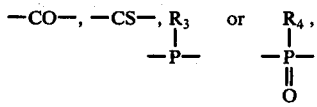

Y represents $-NH-$, and As and Ys may be the same or different.

When at least one of the compounds having the above-mentioned general formula is used as the hardener, gelatin in a light-sensitive photographic material can successfully be hardened without causing any increase in desensitization and fogging, even in the case where the photographic material has been made thinner by decreasing the amount of gelatin. Even when the said photographic material is subjected to high temperature processing using strong processing solutions, the compound used as the hardener in the present invention can display not only such excellent hardening action so as to withstand the heat treatment without causing any increase in fog but also such hardening action as to sufficiently withstand mechanical abrasion encountered in automatic processing machines. These hardening actions are displayed so quickly that when the compound is incorporated into, for example, a coating liquid for forming a gelatin film, desired hardening can be quickly attained immediately after coating of the liquid. Moreover, the compound scarcely causes the so-called posthardening due to spontaneous incubation or heat treatment to make it possible to obtain a lightsensitive silver halide photographic material stabilized in quality.

Typical examples of the compounds having the aforesaid general formula are shown below, but compounds usable in the present invention are not limited to these.

1.
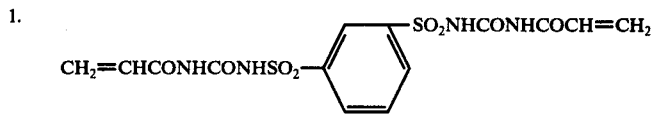

2.
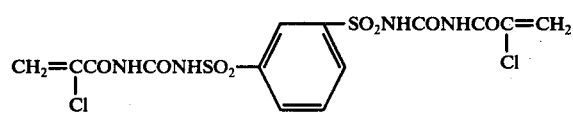

3.
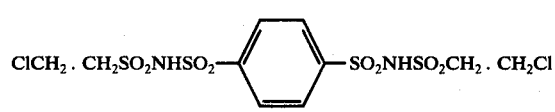

4.
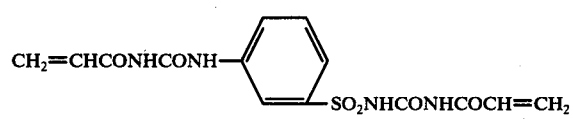

5.
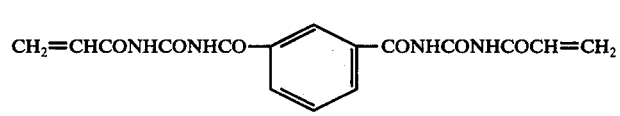

6.
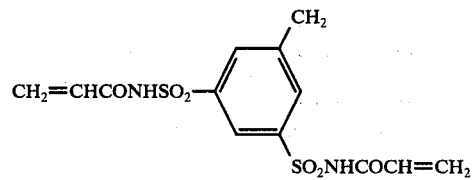

7. 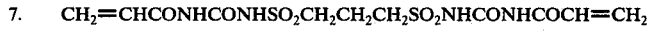

8.
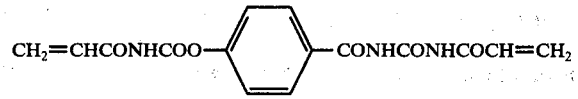

-continued

9. Br—CH$_2$—CH(Br)—CONHCOO—C$_6$H$_4$—CONHCONHCOCHCH$_2$Br
    |
    Br

10. ClCH$_2$.CH$_2$CONHCOOCH$_2$CH$_2$SO$_2$NHCONHCOCH$_2$.CH$_2$Cl

11. ClCH$_2$.CHCONHCOSCH$_2$CONHCONHCOCHCH$_2$Cl
    |                                        |
    Cl                                       Cl

12. CH$_2$=CHCONHCOOCH$_2$CH$_2$SO$_2$CH$_2$CH$_2$CONHCONHCOCH=CH$_2$

13. CH$_2$=CHCONHCONHCO—[cyclohexane-H]—CONHCONHCOCH=CH$_2$

14. CH$_2$=CHCONHCONHCOCH$_2$O—C$_6$H$_4$—OCH$_2$CONHCONHCOCH=CH$_2$

15. CH$_2$=CHCONHCONHCO—C$_6$H$_4$—CONHCONHCOCH=CH$_2$

16. Pyridine with substituents:
    2-OCONHCOCH=CH$_2$
    4-OCONHCONHCOCH=CH... (CH$_2$=CHCONHCONHCO—)
    6-OCONHCOCH=CH$_2$ 17. CH$_2$=CHCONHCO—N(piperazine)N—CH$_2$CONHCONHCOCH=CH$_2$ 18. CH$_2$=CHCONHCO—N(piperazine, 2-CH$_3$)N—CONHCOCH=CH$_2$ 19. CH$_2$=CHSO$_2$NHCO—N(piperazine, 2,5-diCH$_3$)N—CONHSO$_2$CH=CH$_2$ 20. CH$_2$=CHSO$_2$NHCONH—C$_6$H$_4$—SO$_2$NHCONHSO$_2$CH=CH$_2$ (meta)

21. CH$_2$=CHSO$_2$NH—C$_6$H$_4$—NHSO$_2$CH=CH$_2$

22. Cl.CH$_2$.CH$_2$SO$_2$NH—C$_6$H$_4$—NHSO$_2$CH$_2$.CH$_2$Cl

-continued

23. CH$_2$=CHSO$_2$NH(CH$_2$)$_3$—P—(CH$_2$)$_3$NHSO$_2$CH=CH$_2$
        |
        C$_6$H$_5$ (phenyl)

24. BrCH$_2$.CH$_2$SO$_2$NHCOOCH$_2$CH$_2$OCONHSO$_2$CH$_2$CH$_2$Br

25. BrCH$_2$CH$_2$SO$_2$NHCOOCH$_2$.CHOCONHSO$_2$CH$_2$CH$_2$Br
                                  |
                                  CH$_2$Cl

26. ClCH$_2$CHSO$_2$NHCOSCH$_2$CH$_2$SCONHSO$_2$CHCH$_2$Cl
         |                                    |
         Cl                                   Cl

27. CH$_2$=CSO$_2$NHCONH—[triazine ring]—NHCONHSO$_2$C=CH$_2$
        |                                        |
        Cl                                       Cl
                          |
                    NHCONHSO$_2$C=CH$_2$
                                |
                                Cl 28. CH$_2$=CHSO$_2$NHCOO—[cyclohexyl]—OCONHSO$_2$CH=CH$_2$ 29. 
                                  OCONHSO$_2$CH=CH$_2$
    CH$_2$=CHSO$_2$NHCOO—[phenyl]
                                  OCONHSO$_2$CH=CH$_2$ (with additional OCONHSO$_2$CH=CH$_2$ group)

30. CH$_2$=CHSO$_2$NHCONHCONHCONHSO$_2$CH=CH$_2$

31. CH$_2$=CHSO$_2$NHCONH—C—NHCONHSO$_2$CH=CH$_2$
                         ||
                         S

32. ClCH$_2$CH$_2$SO$_2$NHCONH—P—NHCONHSO$_2$CH$_2$CH$_2$Cl
                            |
                            C$_6$H$_5$ (phenyl)

33. CH$_2$=CSO$_2$NHCONHCH$_2$CH$_2$OCH$_2$CH$_2$NHCONHSO$_2$C=CH$_2$
        |                                                  |
        Cl                                                 Cl

34. CH$_2$=CHSO$_2$NHCONH—[phenyl-Cl]—NHCONHSO$_2$CH=CH$_2$
                              |
                              Cl 35. CH$_2$=CHSO$_2$NHCONH—P—NHCONHSO$_2$CH=CH$_2$
                        |
                        C$_2$H$_5$ 36.                      O
                         ||
    CH$_2$=CHSO$_2$NHCONH—P—NHCONHSO$_2$CH=CH$_2$
                         |
                         O—[phenyl]—Cl 37.                           O
                              ||
    ClCH$_2$CH$_2$SO$_2$NHCONH—P—NHCONHSO$_2$CH$_2$CH$_2$Cl
                              |
                              N(CH$_3$)$_2$ 38. 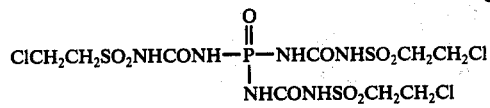

39. 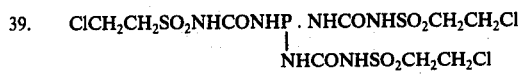

40. 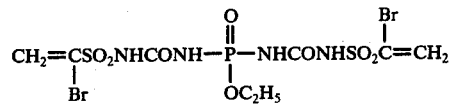

41. 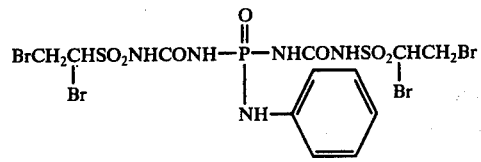

42. 

43. 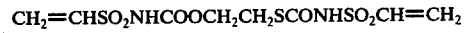
CH$_2$=CHSO$_2$NHCOOCH$_2$CH$_2$SCONHSO$_2$CH=CH$_2$

44. 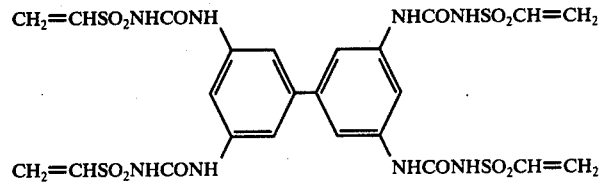

45. 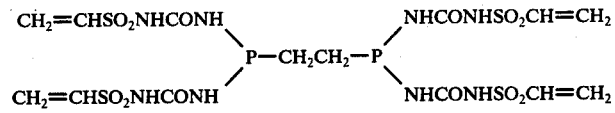

46. 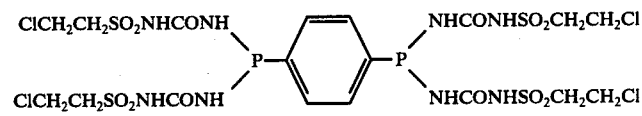

Typical procedures for synthesizing the compounds used in the present invention are explained below with reference to synthesis examples. Synthetis Example 1 (Synthesis of the exemplified compound 1)

Into a solution of 3.0 g. of acrylamide in 120 ml. of ether was dropped with stirring a solution of 1.6 g. of m-benzenedisulfonyl isocyanate in 200 ml. of ether. After the dropping, the resulting mixed solution was stirred for 48 hours to deposit crystals, which were then recovered by filtration and dissolved in acetone. The resulting solution was poured into water to deposit crystals, which were then recovered by filtration and dried to obtain 0.7 g. of the compound 1.

Elementary analysis for $C_{14}H_{14}N_4O_8S_2$:

|  | C | H | N | S |
|---|---|---|---|---|
| Calculated (%) | 39.06 | 3.28 | 13.02 | 14.90 |
| Found (%) | 39.21 | 3.45 | 13.30 | 15.02 |

Synthesis Example 2 (Synthesis of the exemplified compound 5).

Into a solution of 3.5 g. of acrylamide in 50 ml. of acetonitrile was dropped with stirring a solution of 5.4 g. of m-phthaloyl diisocyanate in 20 ml. of acetonitrile. After dropping, the resulting mixed solution was stirred for 6 hours and allowed to stand overnight to deposit crystals, which were then recovered by filtration and dissolved in acetone in an elevated temperature. The resulting solution was poured into water to deposit crystals, which were then recovered by filtration and dried to obtain 5.5 g. of the compound 5.

Elementary analysis for $C_{16}H_{14}N_4O_6$:

|  | C | H | N |
|---|---|---|---|
| Calculated (%) | 53.63 | 3.94 | 15.64 |
| Found (%) | 53.47 | 3.90 | 15.41 |

Synthesis Example 3 (Synthesis of the exemplified compound 8).

Into a solution of 1.37 g. of p-hydroxybenzoic acid and 0.1 g. of dinitrobenzene in 50 ml. of acetonitrile was dropped with stirring a solution of 2 g. of acryloyl isocyanate. After the dropping, the resulting mixed solution was refluxed for 20 hours to deposit crystals, which were then recovered by filtration and dissolved in dimethyl formamide. The resulting solution was poured into water to deposit crystals, which were then recovered by filtration and dried to obtain 1.2 g. of the compound 8.

Elementary analysis for $C_{15}H_{13}N_3O_6$:

|  | C | H | H |
|---|---|---|---|
| Calculated (%) | 54.38 | 3.96 | 12.69 |
| Found (%) | 54.48 | 3.87 | 12.92 |

Synthesis Example 4 (Synthesis of the exemplified compound 21).

To a solution of 10.8 g. of p-phenylenediamine in 200 ml. of ether is added dropwise with stirring at room temperature a solution of 18.9 g. of vinylsulfonyl chloride in 200 ml. of ether. After completion of the addition, the reaction was continued for 48 hours. The resulting crystals are collected by filtration and the collected crystals are dissolved in dimethylformamide. The solution is poured into water to induce recrystallization. The resulting crystals are collected by filtration and dried under reduced pressure to obtain 20.1 g. of the desired compound.

Elementary analysis for $C_{10}H_{12}N_2O_4S_2$:

|  | C | H | N | S |
|---|---|---|---|---|
| Calculated (%) | 41.65 | 4.20 | 9.72 | 22.20 |
| Found (%) | 41.62 | 4.19 | 9.75 | 22.30 |

Synthesis Example 5 (Synthesis of the exemplified compound 25).

To a solution of 5.5 g. of α-monochlorohydrin in 200 ml. of ether is added dropwise with stirring at room temperature a solution of 21.4 g. of β-bromoethylsulfonyl isocyanate in 200 ml. of ether. After completion of the addition, the reaction was continued for 24 hours. The resulting crystals are collected by filtration and dissolved in acetone. The solution is poured in water to induce recrystallization. The resulting crystals are collected by filtration and dried under reduced pressure to obtain 20.2 g. of the desired compound.

Elementary analysis for $C_9H_{15}Br_2ClN_2O_8S_2$:

|  | C | H | N | S |
|---|---|---|---|---|
| Calculated (%) | 20.07 | 2.81 | 5.20 | 11.91 |
| Found(%) | 20.05 | 2.80 | 5.22 | 12.00 |

Synthesis Example 6 (Synthesis of the exemplified compound 42).

To a solution of 10.8 g. of p-aminophenol in 150 ml. of ethyl acetate is added dropwise at room temperature a solution of 26.6 g. of vinylsulfonyl isocyanate in 200 ml. of ethyl acetate. After completion of the addition, the reaction was continued for 48 hours. The resulting crystals are collected by filtration and then dissolved in dimethylsulfoxide. The solution is poured into water to induce recrystallization. The resulting crystals are collected and dried under reduced pressure to obtain 23.5 g. of the desired compound.

Elementary analysis for $C_{12}H_{12}N_2O_7S_2$:

|  | C | H | N | S |
|---|---|---|---|---|
| Calculated (%) | 39.99 | 3.36 | 7.78 | 17.80 |
| Found (%) | 39.96 | 3.21 | 7.77 | 17.72 |

For the hardening of gelatin films of a light-sensitive silver halide photographic material, the hardener according to the present invention is incorporated into such layers composed mainly of gelatin as, for example, sub layer, emulsion layer, inter layer, protective layer and backing layer, of the photographic material. Alternatively, a photographic material having said layers may be dipped in a solution containing the hardener of the present invention. Further, the photographic material may be treated with the hardener of the present invention either before, during or after development. If necessary the hardener of the present invention may be used in combination with other hardener within such an extent as not to injure the effects of the invention.

In incorporating the hardener of the present invention into photographic layers of a light-sensitive silver halide photographic material, the hardener may be forced into a solution in one or more of water and such conventional organic solvents as methanol, dimethyl formamide, ketone, etc. and then added to a coating liquid for forming each of said layers. It is also possible to overcoat the said hardener solution on the upper-most layer of the said layers.

The amount of the hardener to be added to the coating liquid for forming gelatin film varies depending on the kind, physical properties, photographic properties, etc. of the objective gelatin film, but is ordinarily from 0.01 to 100% by weight, preferably from 0.1 to 10% by weight, based on the dry weight of gelatin in the coating liquid. The hardener may be added at any stage during preparation of the coating liquid. To a silver halide emulsion, for example, the hardener is preferably added after second ripening of the emulsion.

Light-sensitive silver halide photographic materials, to which the present invention is applicable, include all such light-sensitive photographic materials as, for example, black-white, color nd pseudocolor photographic materials, and ordinary, printing, X-ray-sensitive and radiation-sensitive photographic materials, which may be any of negative, positive, direct-positive and the like types.

Silver halide emulsions used in the abovementioned light-sensitive silver halide photographic materials may contain as sensitive components all kinds of silver halides such as silver chloride, silver bromide, silver iodobromide, silver chlorobromide, silver chloroiododobromide, etc. These emulsions may be subjected to various chemical sensitization such as noble metal sensitization using salts of noble metals such as ruthenium, rhodium, palladium, iridium, platinum, gold, etc., e.g., ammonium chloropalladate, potassium chloroplatinate, potassium chloropalladite, potassium chloroaurate, etc., sulfur sensitization using sulfur compounds, reduction sensitization using stannous salts, polyamines, etc., and sensitization using polyalkylene oxide type compounds, or to optical sensitization using cyanine, merocyanine and the like dyes. Further, the emulsions may be incorporated with couplers, stabilizers, e.g., mercury, triazole, azaindene, benzothiazolium and zinc compounds, wetting agents, e.g., dihydroxyalkanes, film modifiers comprising water-dispersible, fine granular polymeric substances obtained by emulsion polymerization, coating aids, e.g., saponin an polyethylene glycol lauryl ether, and the like various photographic additives.

When applied to gelatin films of a light-sensitive silver halide photographic material, the hardener of the present invention displays an effective hardening ability without deteriorating such photographic properties as fog and speed of the photographic emulsion. Further, the hardener scarcely causes post-hardening due to incubation to make it possible to obtain a light-sensitive photographic material stabilized in quality. Even when the light-sensitive photographic material is stored over a long period of time, the hardener not only makes the photographic material more stable without any detrimental effect on the photographic emulsions but also shows such excellent hardening action as to sufficiently withstand high temperature quick processing and automatic processing.

The present invention is illustrated in more detail below with reference to examples, but the modes of practice of the present invention are not limited to the examples, and various modifications are possible within the scope of the invention.

EXAMPLE 1

A neutral silver iodobromide emulsion for negative containing 1.5 mole% silver iodide was incorporated with a gold sensitizer, and subjected to a second ripening. The emulsion after ripening was divided into 7 portions. One of the portions was coated, as it was, onto a polyester film base and then dried to prepare a control sample. Six portions of the emulsion thus remained were incorporated individually with methanol solutions each containing the exemplified compound (1), exemplified compound (3), and mucochlorix acid as a control compound, the amount of each of said compounds being shown in Table 1 as the number of moles per 1 g. of gelatine contained in the emulsion. The portions thus treated were individually coated onto a polyester film base and then dried to prepare samples.

The control sample and 6 kinds of samples were measured for their respective hardening characteristics according to the procedure as mentioned below. That is, each of these samples after coating and drying was stored at 25° C. and 55% RH for one day (24 hours), and was then immersed into a 3% aqueous sodium carbonate monohydrate solution kept at 65° C. to measure an immersion time before the gelatine film began to dissolve. Separately, these samples after coating and drying were stored individually at 25° C. and 55% RH for one day, for 30 days under the same conditions as above, and were subjected to heat treatment at 50° C. and 80% RH for 2 days. Each of the samples thus treated was immersed into a 3% aqueous sodium carbonate monohydrate solution for 2 minutes immediately thereafter, the surface of the gelatine film was wiped off. The film surface thus wiped off was scratched with a sapphire needle having a pin point of 1 mm. in radius to measure a load(g) applied to the needle at the time when scratches began to form on the film surface. The value of the load thus measured was taken as a film surface strength of each sample. In addition thereto, the samples after coating and drying were individually stored at 25° C. and 55% RH for one day, and characteristics of photographic emulsion of each sample were measured according to the procedure as provided for in JIS for speed and fogging thereof. The results obtained in the above measurements were as shown in Table 1. In the said table, speed of each sample was represented by a relative value when that of the control sample was taken as 100.

Table 1

| Compound | Amount of compound added (mol/1 g gelatine) | Time Required for initiation of dissolution (min.) | Film surface strength (g) Stored for 1 day | Film surface strength (g) Stored for 30 days | Film surface strength (g) Heat treated for 2 days | Characteristics of photographic emulsion Speed | Characteristics of photographic emulsion Fogging |
|---|---|---|---|---|---|---|---|
| — | — | 1 | 5 | 8 | 15 | 100 | 0.12 |
| Mucochloric acid | $0.5 \times 10^{-4}$ | 4 | 55 | 100 | 165 | 75 | 0.11 |
| Mucochloric acid | $1 \times 10^{-4}$ | 6 | 65 | 120 | 185 | 71 | 0.10 |
| Exemplified compound (1) | $0.5 \times 10^{-4}$ | 12 | 125 | 145 | 185 | 96 | 0.10 |
| Exemplified compound (1) | $1 \times 10^{-4}$ | 18 | 145 | 170 | 190 | 92 | 0.10 |
| Exemplified compound (3) | $0.5 \times 10^{-4}$ | 10 | 125 | 145 | 195 | 94 | 0.10 |
| Exemplified compound (3) | $1 \times 10^{-4}$ | 14 | 140 | 165 | 200 | 91 | 0.10 |

As is clear from the results shown in Table 1, the compounds of the present invention have extremely excellent hardening activity without deteriorating characteristics of photographic emulsion and, in addition, they are less in post-hardening due to storage under ambient conditions and to heat treatment, compared with the control compound.

EXAMPLE 2

A green sensitive high speed silver iodobromide emulsion for color photography containing 3 mol% of silver iodide was subjected to a second ripening. Thereafter, the emulsion was incorporated with 1-(4'-phenoxy-3'-sulfophenyl)-3-heptadecyl-5-pyrazolone as a magenta coupler, and was then divided into 7 portions. Six portions of the emulsion thus divided were incorporated individually with methanol solutions each containing the exemplified compound (5), exemplified compound (7), and mucochloric acid as a control compound, the amount of each of said compounds being shown as in Table 2 as the number of moles per 1 g. of gelatine contained in the emulsion. Thereafter, the portion which had not been incorporated with the magenta coupler and 6 portions thus incorporated were coated individually onto a cellulose triacetate film base and then dried. Thus, a control sample containing no hardening agent and 6 kinds of samples each containing a hardening agent were obtained. Each sample was measured according to a procedure similar to that of Example 1 for its hardening characteristics. With respect to characteristics of photographic emulsion of each sample were measured by subjecting said sample to color development treatment with a color developer containing diethyl-p-phenylenediamine as the main ingredient subsequently subjecting the treated sample according to ordinary procedures to bleaching, fixing and water washing and then to sensitometry. The results obtained in the respective treatments above were as shown in Table 2. In the said table, speed of each sample was represented by a relative value when that of the control-sample was taken as 100.

Table 2

Hardening characteristics

| Compound | Amount of compound added (mol/1 g gelatine) | Time required for initiation of dissolution (min.) | Film surface strength (g) Stored for 1 day | stored for 30 days | Heat treated for 2 days | Characteristics photographic emulsion Speed | Fogging |
|---|---|---|---|---|---|---|---|
| — | — | 1 | 5 | 8 | 14 | 100 | 0.12 |
| Mucochloric acid | $0.5 \times 10^{-4}$ | 3 | 45 | 90 | 155 | 78 | 0.10 |
| Mucochloric acid | $1 \times 10^{-4}$ | 5 | 55 | 110 | 180 | 74 | 0.10 |
| Exemplified compound (5) | $0.5 \times 10^{-4}$ | 17 | 140 | 150 | 185 | 90 | 0.10 |
| Exemplified compound (5) | $1 \times 10^{-4}$ | 27 | 170 | 180 | 205 | 87 | 0.10 |
| Exemplified compound (7) | $0.5 \times 10^{-4}$ | 10 | 105 | 130 | 165 | 95 | 0.10 |
| Exemplified compound(7) | $1 \times 10^{-4}$ | 12 | 125 | 150 | 190 | 92 | 0.10 |

As is clear from the results shown in Table 2, the compounds of the present invention have excellent hardening activity similar to that obtained in Example 1. It has also been confirmed that the present compounds do not inhibit at all color development of the coupler and, in addition, they do not bring about any color stain.

EXAMPLE 3

A 5% aqueous gelatine solution was divided into 7 portions. Six portions of the solution thus divided were incorporated individually with methanol solutions each containing the exemplified compound (8), exemplified compound (14), and mucochloric acid as a control compound, the amount of each of said compounds being shown in Table 3 as the number of moles per 1 g. of gelatine. The gelatine solutions including the portion which had not been incorporated with any of the aforesaid compounds and 6 portions thus incorporated were individually coated onto a polyester film base and dried. Thus, there were obtained a control sample containing no hardening agent and 6 kinds of samples each containing the aforesaid hardening agent. Each of these samples was measured according to a procedure similar to that of Example 1 for its hardening characteristics to obtain the results as shown in Table 3.

Table 3

Hardening characteristics

| Compound | Amount of compound added (mol/1 g gelatine) | Time required for initiation of dissolution (min.) | Film surface strength (g) Stored for 1 day | Stored for 30 days | Heat treated for 2 days |
|---|---|---|---|---|---|
| — | — | 1.5 | 5 | 9 | 15 |
| Mucochloric acid | $0.5 \times 10^{-4}$ | 5 | 50 | 100 | 185 |
| Mucochloric acid | $1 \times 10^{-4}$ | 8 | 65 | 125 | 205 |
| Exemplified compound (8) | $0.5 \times 10^{-4}$ | 10 | 100 | 115 | 180 |
| Exemplified compound (8) | $1 \times 10^{-4}$ | 14 | 130 | 150 | 200 |
| Exemplified compound (14) | $0.5 \times 10^{-4}$ | 11 | 100 | 120 | 190 |
| Exemplified compound (14) | $1 \times 10^{-4}$ | 15 | 130 | 155 | 220 |

As is clear from the results shown in Table 3, the compound of the present invention have excellent hardening activity, and gelatine films hardened thereby are high in film surface strength and the surface thereof will not suffer serious damage from severe mechanical rubbing.

EXAMPLE 4

A neutral silver iodobromide emulsion for negative containing 1.5 mole% silver diode was incorporated with a gold sensitizer, and subjected to a second ripening. The emulsion after ripening was divided into 7 portions. One of the portions was coated, as it was, onto a polyester film base and then dried to prepare a control sample. Six portions of the emulsion thus remained were incorporated individually with methanol solutions each containing the exemplified compound (21), exemplified compound (27), and mucochloric acid as a control compound, the amount of each of said compounds being shown in Table 4 as the number of moles per 1 g. of gelatine contained in the emulsion. The portions thus treated were individually coated into a polyester film base and then dried to prepare samples.

The control sample and 6 kinds of samples were measured for their respective hardening characteristics according to the procedure as mentioned below. That is, each of these samples after coating and drying was stored at 25° C. and 55% RH for one day (24 hours), and was then immersed into a 3% aqueous sodium carbonate monohydrate solution kept at 65° C. to measure an immersion time before the gelatine film began to dissolve. Separately, these samples after coating and drying were stored individually at 25° C. and 55% RH for one day, for 30 days under the same conditions as above, and were subjected to heat treatment at 50° C. and 80% RH for 2 days. Each of the samples thus treated was immersed into a 3% aqueous sodium carbonate monohydrate solution and, immediately thereafter, the surface of the gelatine film was wiped off. The film surface thus wiped off was scratched with a sapphire needle having a pin point of 1 mm. in radius to measure a load(g) applied to the needle at the time when scratches began to form on the film surface. The value of the load thus measured was taken as a film surface strength of each sample. In addition thereto, the samples after coating and drying were individually stored at 25° C. and 55% RH for one day, and characteristics of photographic emulsion of each sample were measured according to the procedure as provided for in JIS for speed and fogging thereof. The results obtained in the above measurements were as shown in Table 4. In the said table, speed of each sample was represented by a relative value when that of the control sample was taken as 100.

EXAMPLE 5

A green sensitive high speed silver iodobromide emulsion for color photography containing 3 mol% of silver iodide was subjected to a second ripening. Thereafter, the emulsion was incorporated with 1-(4'-phenoxy-3'-sulfophenyl)-3-heptadecyl-5-pyrazolone as a magenta coupler, and was then divided into 7 portions. Six portions of the emulsion thus divided were incorporated individually with methanol solutions each containing the exemplified compound (25), exemplified compound (29), and mucochloric acid as a control compound, the amount of each of said compounds being shown as in Table 5 as the number of moles per 1 g. of gelatine contained in the emulsion. Thereafter, the portion which had not been incorporated with the magenta coupler and 6 portions thus incorporated were coated individually onto a cellulose triacetate film base and then dried. Thus, a control sample containing no hardening agent and 6 kinds of samples each containing a hardening agent were obtained. Each sample was measured according to a procedure similar to that of Example 4 for its hardening characteristics. With respect to characteristics of photographic emulsion of each sample were measured by subjecting said sample to color development treatment with a color developler containing diethyl-p-phenylenediamine as the main ingredient subsequently subjecting the treated sample according to Table 4

| | | Hardening characteristics | | | | | |
|---|---|---|---|---|---|---|---|
| | Amount of compound added (mol/l g gelatine) | Time required for initiation of dissolution (min.) | Film surface strength (g) | | | Characteristics of photographic emulsion | |
| Compound | | | Stored for 1 day | Stored for 30 days | Heat treated for 2 days | Speed | Fogging |
| — | — | 1 | 5 | 8 | 15 | 100 | 0.12 |
| Mucochloric acid | $0.5 \times 10^{-4}$ | 4 | 50 | 100 | 165 | 78 | 0.10 |
| Mucochloric acid | $1 \times 10^{-4}$ | 6 | 65 | 115 | 185 | 74 | 0.10 |
| Exemplified compound (21) | $0.5 \times 10^{-4}$ | 15 | 130 | 145 | 180 | 90 | 0.11 |
| Exemplified compound (21) | $1 \times 10^{-4}$ | 22 | 155 | 175 | 205 | 86 | 0.10 |
| Exemplified compound (27) | $0.5 \times 10^{-4}$ | 9 | 110 | 135 | 180 | 94 | 0.10 |
| Exemplified compound (27) | $1 \times 10^{-4}$ | 12 | 125 | 145 | 200 | 91 | 0.10 |

As is clear from the results shown in Table 4, the compounds of the present invention have extremely excellent hardening activity without deteriorating characteristics of photographic emulsion and, in addition, they are less in post-hardening due to storage under ambient conditions and to heat treatment, compared with the control compound.

ordinary procedures to bleaching, fixing and water washing and then to sensitometry. The results obtained in the respective treatments above were as shown in Table 5. In the said table, speed of each sample was represented by a relative value when that of the control sample was taken as 100.

Table 5

| | | Hardening characteristics | | | | | |
|---|---|---|---|---|---|---|---|
| | Amount of compound added (mol/l g gelatine) | Time required for initiation of dissolution (min.) | Film surface strength (g) | | | Characteristics of photographic emulsion | |
| Compound | | | Stored for 1 day | Stored for 30 days | Heat treated for 2 days | Speed | Fogging |
| — | — | 1 | 5 | 8 | 14 | 100 | 0.11 |
| Mucochloric | | | | | | | |

Table 5-continued

| Compound | Amount of compound added (mol/1 g gelatine) | Time required for initiation of dissolution (min.) | Film surface strength (g) | | | Heat Characteristics of photographic emulsion | |
|---|---|---|---|---|---|---|---|
| | | | Stored for 1 day | Stored for 30 days | treated for 2 days | Speed | Fogging |
| acid | $0.5 \times 10^{-4}$ | 3 | 50 | 90 | 160 | 76 | 0.10 |
| Mucochloric acid | $1 \times 10^{-4}$ | 6 | 60 | 110 | 185 | 72 | 0.10 |
| Exemplified compound (25) | $0.5 \times 10^{-4}$ | 11 | 120 | 135 | 185 | 90 | 0.10 |
| Exemplified compound (25) | $1 \times 10^{-4}$ | 14 | 135 | 150 | 190 | 85 | 0.10 |
| Exemplified compound (29) | $0.5 \times 10^{-4}$ | 9 | 100 | 120 | 170 | 93 | 0.10 |
| Exemplified compound (29) | $1 \times 10^{-4}$ | 11 | 110 | 145 | 195 | 90 | 0.01 |

As is clear from the results shown in Table 5, the compounds of the present invention have excellent hardening activity similar to that obtained in Example 4. It has also been confirmed that the present compounds do not inhibit at all color development of the coupler and, in addition, they do not bring about any color stain.

EXAMPLE 6

A 5% aqueous gelatine solution was divided into 7 portions. Six portions of the solution thus divided were incorporated individually with methanol solutions each containing the exemplified compound (28), exemplified compound (34), and mucochloric acid as a control compound, the amount of each of said compounds being shown in Table 6 as the number of moles per 1 g. of gelatine. The gelatine solutions including the portion which had not been incorporated with any of the aforesaid compounds and 6 portions thus incorporated were individually coated into a polyester film base and dried. Thus, there were obtained a control sample containing no hardening agent and 6 kinds of samples each containing the aforesaid hardening agent. Each of these samples was measured according to a procedure similar to that of Example 4 for its hardening characteristics to obtain the results as shown in Table 6.

ening activity, and gelatine films hardened thereby are high in film surface strength and the surface thereof will not suffer serious damage from severe mechanical rubbing.

What we claim is:

1. A process for hardening gelatin which comprises reacting photographic gelatin with a compound selected from the group consisting of formulae (I) or (II) which are as follows:

$$[A - B - (NHCO)_{m-1} - X]_{n-1} - Z - Y - NH(CONH)_{m-1} - B - A(I)$$

wherein A is $CH_2=CH-$, $CH_2=C(R_1)-$, $CH_2(R_2)-CH_2-$ or $CH_2(R_1)-CH(R_2)-CH(R_2)-$ (where $R_1$ and $R_2$ are halogen atoms); B is $-CO-$ or $-SO_2-$; m is 1 or 2; X is oxygen, sulfur, $-NH-$, $-NHCO-$ or $-NHSO_2-$; n is an integer of 2 or more; Y is $-CO-$ or $-SO_2-$; and Z is an n-valent aliphatic, aromatic or heterocyclic group, and when Z is an n-valent aromatic or heterocyclic group, Y is $-CO-$, and when Z is an n-valent aromatic, heterocyclic or aliphatic group, Y is $-SO_2-$; As, Bs and Xs may individually be the same or different, or $$[A' - SO_2 - (NHCO)_{m'} - Y]_N - Z' \qquad (II)$$

wherein A' is $CH_2=CH-$, $CH_2=C(R_1)-$,

Table 6

| Compound | Amount of compound added (mol/1 g gelatine) | Time required for initiation of dissolution (min.) | Film surface strength (g) | | |
|---|---|---|---|---|---|
| | | | Stored for 1 day | Stored for 30 days | Heat treated for 2 days |
| — | — | 1.5 | 4 | 9 | 14 |
| Mucochloric acid | $0.5 \times 10^{-4}$ | 5 | 48 | 105 | 180 |
| Mucochloric acid | $1 \times 10^{-4}$ | 8 | 65 | 120 | 200 |
| Exemplified compound (28) | $0.5 \times 10^{-4}$ | 9 | 90 | 110 | 180 |
| Exemplified compound (28) | $1 \times 10^{-4}$ | 11 | 100 | 125 | 195 |
| Exemplified compound (34) | $0.5 \times 10^{-4}$ | 12 | 110 | 130 | 195 |
| Exemplified compound (34) | $1 \times 10^{-4}$ | 16 | 130 | 150 | 205 |

As is clear from the results shown in Table 6, the compound of the present invention have excellent hard- $CH_2(R_1)-CH_2-$ or $CH_2(R_1)-CH_2(R_2)-$ (where $R_1$ and $R_2$ are halogen atoms); $m'$ is 1 or 2; $n'$ is an integer of 2 or more; $Z'$ is an n-valent aliphatic, alicyclic, aromatic or heterocyclic group, —CO—,

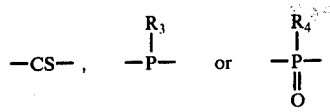 

in which $R_3$ and $R_4$ individually represent a substituted or unsubstituted alkyl, aryl, alkoxy, aryloxy, alkylamino or arylamino group or —Y— (CONH)SO$_2$—A′, and when $m'$ is 1, Z is an n-valent aromatic or heterocyclic group, and when $m'$ is 2, Z is an n-valent aromatic, heterocyclic, aliphatic or alicyclic group,

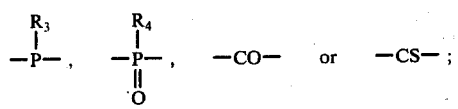

and Y represents —NH— when $m'$ is 1 or when Z′ is —CO—, —CS—,

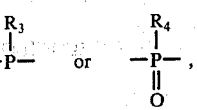

or Y represents —NH—, oxygen or sulfur when $m'$ is 2.

2. A light sensitive silver halide photographic element which comprises a support, and coated thereon a plurality of gelatin-containing photographic layers at least one of which is a light-sensitive gelatinous silver halide emulsion layer, at least one of said gelatin-containing photographic layers having been hardened with a compound of the formula in claim 1.

3. A process for hardening gelatin which comprises reacting photographic gelatin with a compound selected from the group consisting of

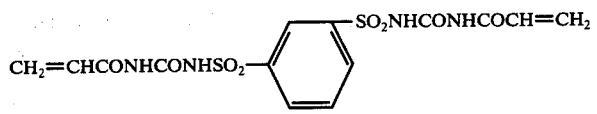

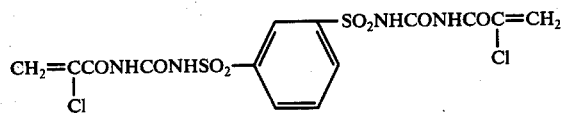

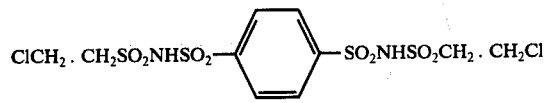

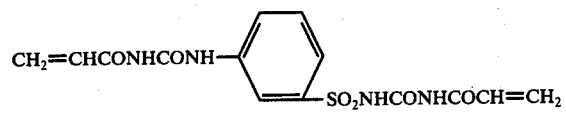

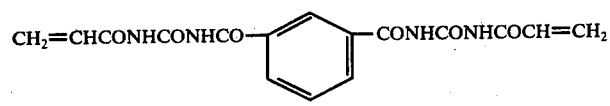

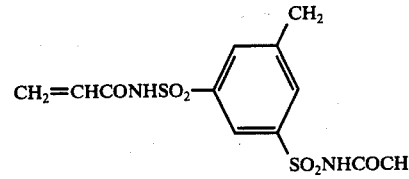

CH$_2$=CHCONHCONHSO$_2$CH$_2$CH$_2$CH$_2$SO$_2$NHCONHCOCH=CH$_2$

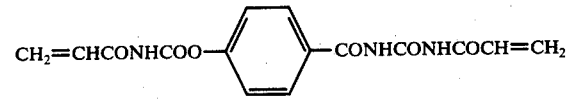

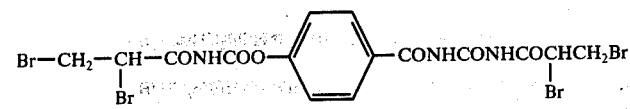

ClCH$_2$.CH$_2$CONHCOOCH$_2$CH$_2$SO$_2$NHCONHCOCH$_2$.CH$_2$Cl

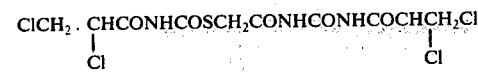

CH$_2$=CHCONHCOOCH$_2$CH$_2$SO$_2$CH$_2$CH$_2$CONHCONHCOCH=CH$_2$

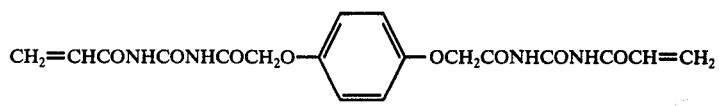
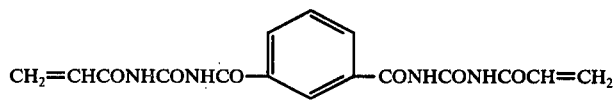
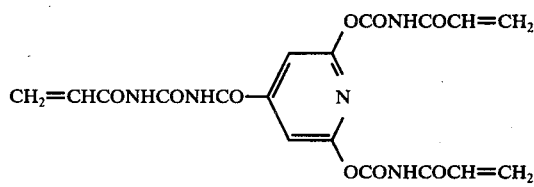
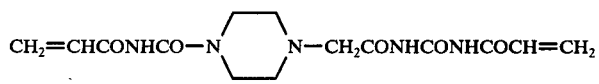
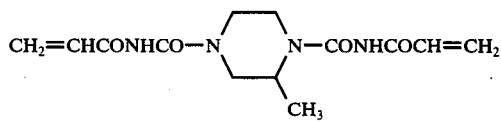
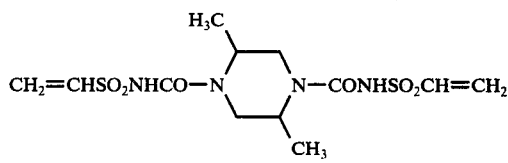
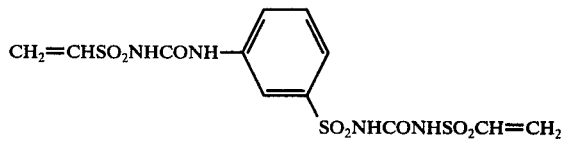
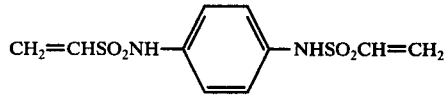
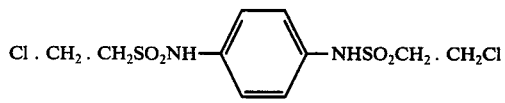
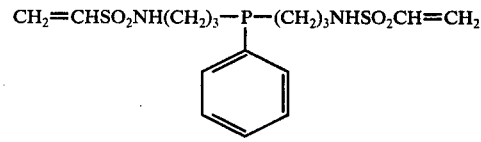
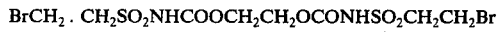
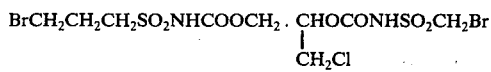
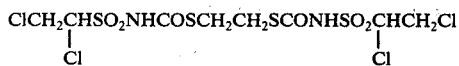

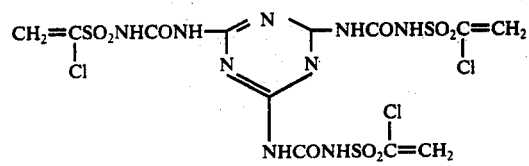
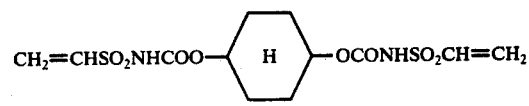
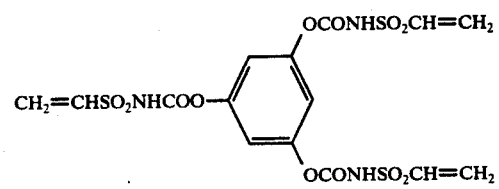
CH₂=CHSO₂NHCONHCONHCONHSO₂CH=CH₂
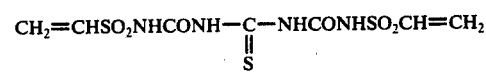
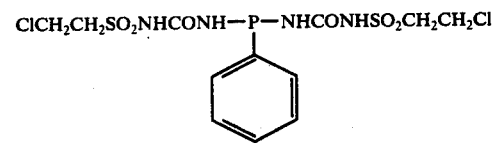
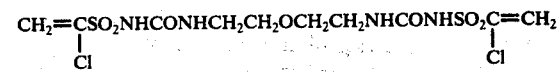
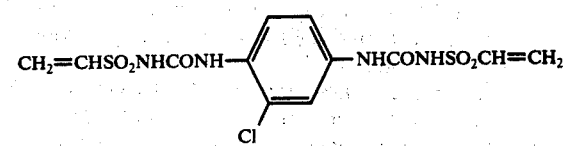
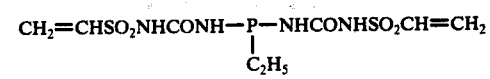
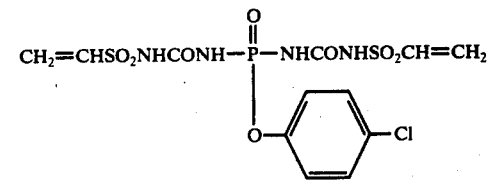
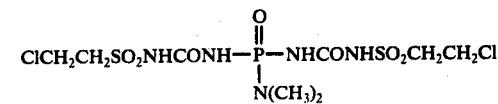
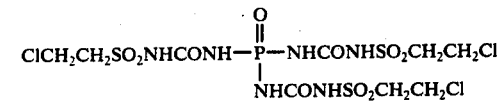
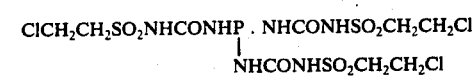
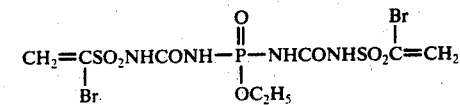

-continued

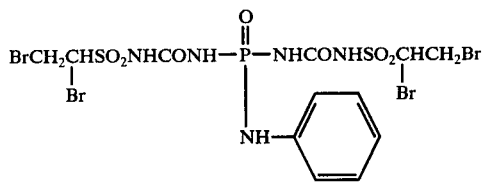

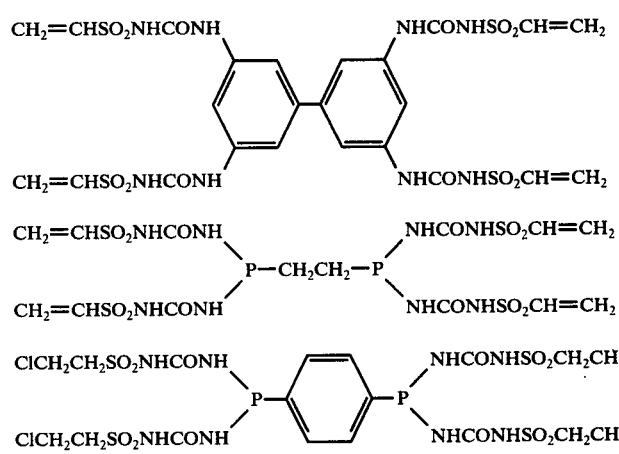

4. A light sensitive silver halide photographic element which comprises a support, and coated thereon a plurality of gelatin-containing photographic layers at least one of which is a light-sensitive gelatinous silver halide emulsion layer, at least one of said gelatin-containing photographic layers having been hardened with a compound of the formula in claim 3.

5. A process as claimed in claim 3, wherein said photographic gelatin comprises a gelatin-containing liquid capable of forming a photographic layer of a light-sensitive silver halide photographic material.

6. A process as claimed in claim 3, wherein said photographic gelatin comprises a gelatin-containing photographic layer of a light-sensitive silver halide photographic material.

7. A process as claimed in claim 5 wherein said compound is used in an amount from 0.01 to 100% by weight, based on the dry weight of the gelatin.

* * * * *